(12) United States Patent
Waters-Murphy et al.

(10) Patent No.: US 9,941,731 B1
(45) Date of Patent: Apr. 10, 2018

(54) CARRY BAG OR PURSE WITH REMOTE CHARGING AND ILLUMINATION FEATURES

(71) Applicants: Leah Waters-Murphy, Madison Heights, MI (US); Marcus Harold Waters, Southfield, MI (US)

(72) Inventors: Leah Waters-Murphy, Madison Heights, MI (US); Marcus Harold Waters, Southfield, MI (US)

(73) Assignee: Leah Waters-Murphy, Madison Heights, MI (US)

( * ) Notice: Subject to any disclaimer, the term of this patent is extended or adjusted under 35 U.S.C. 154(b) by 55 days.

(21) Appl. No.: 14/940,746

(22) Filed: Nov. 13, 2015

(51) Int. Cl.
*H02J 7/00* (2006.01)
*H02J 7/02* (2016.01)
*A45C 3/06* (2006.01)
*A45C 15/06* (2006.01)
*A45C 15/00* (2006.01)

(52) U.S. Cl.
CPC ............... *H02J 7/025* (2013.01); *A45C 3/06* (2013.01); *A45C 15/00* (2013.01); *A45C 15/06* (2013.01); *H02J 7/0052* (2013.01); *H02J 2007/0062* (2013.01)

(58) Field of Classification Search
CPC . A45C 3/06; A45C 15/00; A45C 15/06; H02J 7/0055
USPC ......................................................... 320/108
See application file for complete search history.

(56) References Cited

U.S. PATENT DOCUMENTS

| | | | | |
|---|---|---|---|---|
| 6,010,067 A * | 1/2000 | Elbaum | ................... | G06Q 20/04 235/375 |
| 6,434,032 B1 * | 8/2002 | Romano | ............... | H02J 7/0045 320/113 |
| 6,597,568 B2 * | 7/2003 | Ryder | ................... | G06F 1/1628 206/576 |
| 6,870,089 B1 * | 3/2005 | Gray | ..................... | H01L 31/042 136/200 |
| 6,894,457 B2 * | 5/2005 | Germagian et al. .. | | H02M 7/003 320/119 |

(Continued)

*Primary Examiner* — Sun Lin
(74) *Attorney, Agent, or Firm* — Young Basile Hanlon & MacFarlane, P.C.

(57) ABSTRACT

A bag device that includes a shell having an interior surface and an exterior surface in which the interior surface having at least a first side wall and a second side wall and a bottom wall. The bag device also has a power element positioned proximate to the interior surface, the power element including a body member that has a first face, an opposed second face and an outer perimeter defined by an outer edge surface of the body member. The power element also includes a power storage unit connected to the body member and at least one power outlet in electrical communication with the power storage unit. The at least one power outlet configured to releasibly and operatively receive a power cord associated with a personal electronic device. Also disclosed is a power element device configured to be releasibly inserted in the a carry bag that includes a body member that has a first face and an opposed second face as well as an outer perimeter defined by the body member. The power element device also includes at least one rechargaeable power storage unit attached to the first face of the body member as well as at least one power outlet in electrical communication with the at least one rechargeable power storage unit.

14 Claims, 4 Drawing Sheets

(56) References Cited

U.S. PATENT DOCUMENTS

| | | | |
|---|---|---|---|
| 7,111,959 B2 * | 9/2006 | Kurcz et al. | A45C 15/06 362/155 |
| 8,593,108 B2 * | 11/2013 | Ferber et al. | H02J 7/0044 320/114 |
| 2009/0224722 A1 * | 9/2009 | Causey | H02J 7/355 320/101 |
| 2012/0262117 A1 * | 10/2012 | Ferber et al. | H02J 7/0047 320/111 |
| 2014/0000771 A1 * | 1/2014 | Sherman et al. | A45C 3/06 150/106 |

* cited by examiner

CARRY BAG OR PURSE WITH REMOTE CHARGING AND ILLUMINATION FEATURES

BACKGROUND

The present invention pertains to carry bags such as purses, handbags and the like configured with lighting systems and suitable power sources.

It is now commonplace for people to rely on portable electronics such as cell phones, digital music players, personal data organizers, smart phones and the like. As technology progresses these devices have evolved from basic communication and/or playback devices to sophisticated telecommunication devices and personal computers. Indeed, with the advent of the more recent generations of smartphone technology, there is greater reliance on and usage of personal electronic devices. This increased usage can result in greater demand on the battery associated with the given electronic device. For many users, there is an increasing need to provide extended usage and recharge capability—either in emergency or planned usage situations.

Various individual cell phone battery back-up devises have been proposed either as single use devices or as rechargeable units to augment the useful life of the electronic device between battery charges. Many of these cell phone battery back-up devices are configured as sticks or cubes that can be carried along with the user. These back-up devices can be carried by the user against the need for external mobile charge. Such devices need to be small and portable. However, portability and small size means that free standing devices such as stick or cube recharging units can be readily lost or mislaid.

These devices tend to be carried in purses and carry bags where they shift and become hidden. Because they remain contained in purses or carry bags, there is a tendency for the owner to forget to recharge them after use. Thus, the user is likely to have a back-up battery that is not fully charged when it is next needed. Additionally, back-up battery devices can add uneven weight to the device in which they are carried.

In order to overcome the draw backs just mentioned, some cell phone back-up charge devices have been configured as cell phone cases and the like. These back-up devices are cumbersome and add to the bulk and size of the associated cell phone during use. Regardless of the configuration, cell phone back up devices charge devices have limitations. The effectiveness of such devices can be limited by size considerations as well as by charge capacity and can provide only back up charge for an extremely limited time. Because of these and other limitations back up charge devices have been generally used for single emergency use rather than as equipment to provide extended talk time, video viewing and the like.

Various alternate cell phone back-up devices have been proposed. Some of these include devices such as purses, back packs and the like that are configured with solar arrays designed to provide charging power to the associated cell phone. These types of arrays tend to be fragile and easily broken or damaged.

Locating items in purses and carry bags can also be a challenge; particularly in settings with low ambient lighting. It is desirable to provide purses and carry bags with interior lighting that can illuminate the bag interior when desired in order to help the user locate items contained in the bag. Illumination mechanisms proposed to date have been fragile and/or have required high power levels to operate necessitating either short operational life spans or large, heavy battery power sources to function.

It would be desirable to provide a device that can prove back-up charge for a cell phone or other electronic device that is multi-functional and provides or permits additional uses or applications. It would also be desirable to provide a carry bag or purse having a durable long-lived, robust illumination system

SUMMARY

A carry bag device that includes a shell having at least a first side wall and a second side wall is disclosed. The side walls define an opening proximate to a first upper region and also a second lower region distal to the first upper region. The bag device has a power element and illumination member connected to second lower region of the side walls of the shell that extends between the side walls to define at least a portion of the bottom of the carry bag. The power element and illumination member includes a body member that has a first face, an opposed second face and an outer perimeter defined by the outer edge surface of the body member. The power element and illumination also includes at least two rechargeable power storage units connected to the body member, at least one power outlet in electrical communication with the power storage units and means for engaging the power units in a sequential manner to deliver power to the at least one power outlet. The power outlet is configured to releasibly and operatively receive a power cord associated with a personal electronic device. The power element and illumination device also includes at least one illumination member contained within the body member and positioned to deliver light into the interior of the carry bag.

DESCRIPTION OF THE DRAWINGS

In order to facilitate the present disclosure, reference is made to the following illustrative drawing figures in which like reference numerals are employed where appropriate throughout the various views.

DETAILED DESCRIPTION

Disclosed herein is a purse or carry bag device such as carry bag 100 that can be employed to provide auxiliary illumination and/or to provide electric power to a suitable personal electronic device. The carry bag 100 has at least one power supply/illumination element 10 that is integrally connected to the bag. The power supply/illumination element is rechargeable, can provide emergency power to illuminate the interior of the carry bag and/or to a provide power to a suitable personal electronic device such as a cell phone or the like. In the embodiment depicted herein, the power supply/illumination element 10 can compose at least a portion of the structure of the carry bag 100. In various embodiments, the power supply/illumination element 10 can make up at least a portion of the base of the carry bag 100. In the embodiment depicted in FIG. 1, the power supply/illumination element 10 composes the bottom portion of the associated carry bag 100.

The power supply/illumination element 10 can be rechargeable and provide emergency power to a suitable personal electronic device such as a cell phone, etc. When used herein, the term "personal electronic device" is taken to mean any of a variety electronic devices including but not limited to cell phones as well as other digital playback device such as an MP3 player, computer tablet device or the like. In certain situations, it is contemplated that the electronic device will be a device capable of multiple applications including, but not limited to, telephonic communications such as talk and text as well as MP3 playback, video play back, internet access and the like.

In certain embodiments, it is contemplated that the carry bag 100 will be composed of a carry bag unit 110 with at least one power supply/illumination element 10 integrally connected thereto. The carry bag 100 includes an upper carry bag unit 110 that integrally connected to the at least one power supply/illumination element 10 in a manner such that power supply/illumination element 10 forms at least a portion of the structure of the carry bag 100. In specific embodiments as disclosed herein, the power supply element 10 can make up all or a part of the base or bottom member of the carry bag 100. It is also contemplated that the carry bag 100 can be a purse, backpack or other suitable device and that the carry bag unit 110 can be configured accordingly. Thus, while the discussion herein is generally directed to carry bag units 110 configured as a purse with the power supply element 10 positioned at a lowermost surface or region, it is also contemplated that, in certain embodiments, the power supply element 10 as disclosed herein can be integrated into the associated carry bag unit 110 at other suitable locations if desired or required.

The power supply/illumination element 10 can be connected to the carry bag unit 110 in any suitable manner. Non-limiting examples of such connection mechanisms include permanent attachment to the carry bag unit 110 as by stitching, adhesive bonding or the like.

Thus, in certain embodiments, the power supply/illumination element 10 can be integrated into the associated carry bag 110 during assembly or manufacture of the associated carry bag. It is also considered within the purview of this disclosure that the power supply element 10 could be attached into a previously manufactured carry bag unit 110 as desired or required. It is also contemplated that the power supply element 10 can be integrated into a suitable stand-alone wallet also as disclosed herein.

Figure 1A:
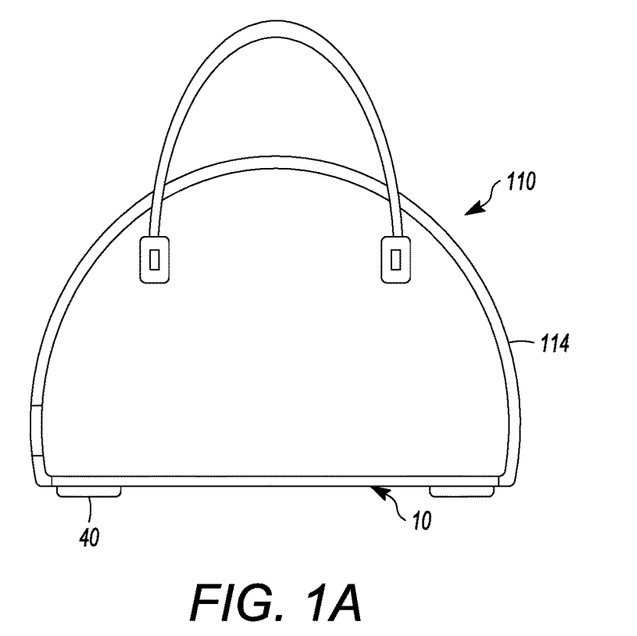
FIG. 1A is a side view of a representative carry bag as defined that includes an embodiment of the power element as disclosed.
Figure 1B:
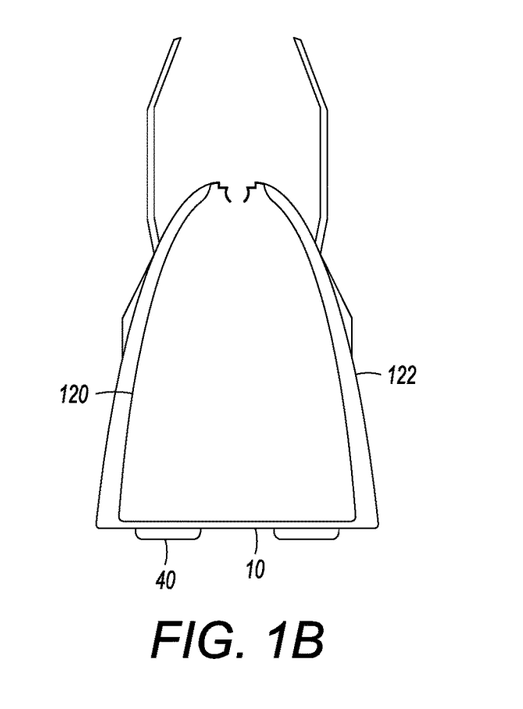
FIG. 1B is an end view of the embodiment of the carry bag of FIG. 1A.
Figure 2A:
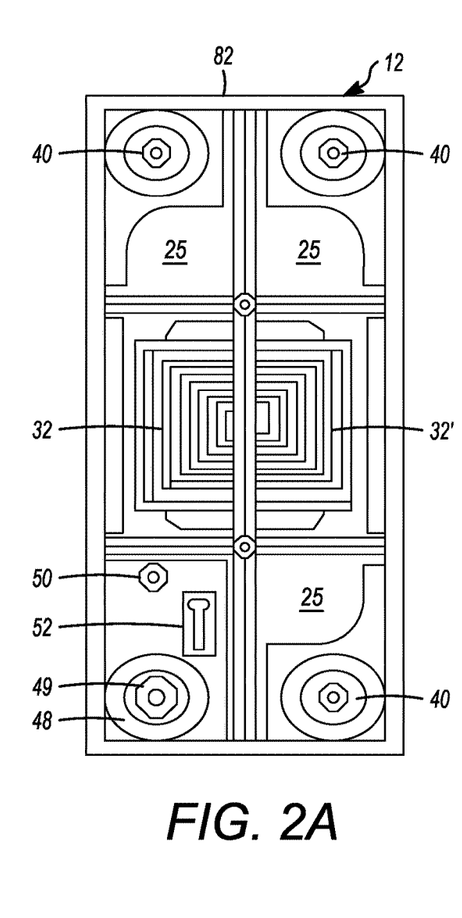
FIG. 2A is a lower view of the carry bag of FIG. 1A with outer covering removed for clarity to illustrate an embodiment of the power supply element.
Figure 2B:
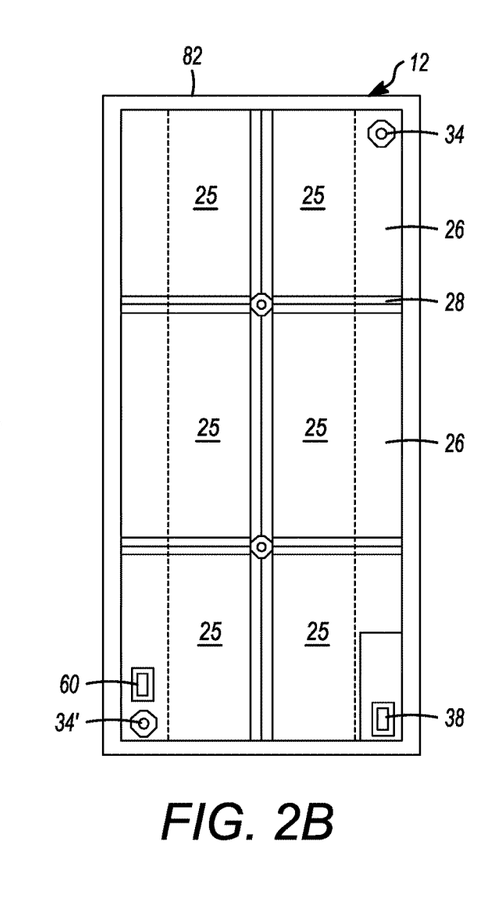
FIG. 2B is a upper view of the power supply element unit of FIG. 2A.
Figure 2C:
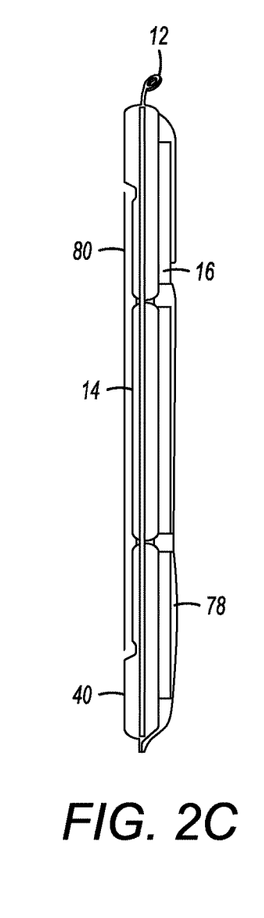
FIG. 2C is a side view of the power supply unit of FIG. 2A.

In the embodiment depicted in FIGS. 1-2, the power supply/illumination element 10 can be configured and integrated into a suitable carry bag unit 110 such as purse, backpack or the like as its base or bottom member. The purse or other suitable carry bag unit 110 will generally have a shell member 114 that is composed of an interior surface and an exterior surface. The carry bag unit 110 will typically have a first side wall member 120, a second side wall member 122 and a bottom member made up either whole or in part by the power supply element 10.

It is contemplated that in certain backpack configurations, the power supply/illumination element 10 may be positioned along the spine of the respective backpack unit with any USB port being located in a suitably accessible position relative to the respective opening defined in the associated backpack. It is also contemplated that the carry bag 110 can be configured as a masculine or feminine unit as desired or required such as the handled devices depicted in FIGS. 1A and 1B as well as hand held clutches, brief cases, back packs, pouch bags etc.

The power supply/illumination element 10 as disclosed herein is configured to provide a defined interval of interior illumination and/or electronic power support for at least one personal electronic device. The personal electronic device can plug in to a suitable power supply port such as a PC USB port or the like present on the power supply/illumination element 10 to access emergency or auxiliary power stored in the power supply element 10. The power supply/illumination element 10 can also configured to provide illumination in the dark or low-light conditions in addition to charging a personal electronic device such as a smart phone, tablet device or other devices. It is contemplated that the power supply/illumination element 10 may provide both illumination and power supply simultaneously in certain situations. However in many situations, the power supply/illumination element 10 will supply illumination on demand at times distinct from the use as a power supply delivery mechanism.

In various embodiments, the power supply element 10 can also be configured to be rechargeable and will include suitable recharging is means. These can include induction coils or at least one USB port configured for charging purposes which will be discussed in detail subsequently.

In the embodiment as broadly disclosed herein with reference to FIG. 2, the power supply element unit 10 includes a body member 12. The body member 12 can have a generally planar configuration that defines a first face 14 and an opposed second face 16. The body member 12 can be of any suitable perimeter configuration and can be dimensioned to be attached to the associated carry bag 110. In the embodiment depicted, the body member 12 can be dimensioned to attach to the lower regions of the side members 120 and 122 of the shell 114 to form the base or bottom of the carry bag 110.

The body member 12 can be composed of a single planar member segment, if desired or required. However, in many embodiments, the body member 12 can be composed of a plurality of segments are joined together in a manner that provides flexible limited articulable junctions with suitable electrical connectivity therebetween. The embodiment depicted in FIG. 2 has six such segments which can be configured to operate together or independent of one another. It is also contemplated the certain embodiments may have two segments, four segments, etc. It is understood that the number of the individual subpanels and their respective dimension can vary from unit 10 to unit depending upon the dimensions of the particular carry bag 110 involved.

The various segments or subpanels can be joined and maintained in electrical and electronic communication by any suitable means. In the embodiment depicted in FIG. 2, the body member 12 is composed of six interconnected segments or subpanels 26 that are joined to one another by suitable means such a suitable flange 28 such as flexible elongated polymeric gusset interposed therebetween. In certain embodiments, one or more the multiple subpanels 26 can each be configured with a suitable illumination device 25 that will provide suitable temporary illumination to the interior of the carry bag 100. The multiple subpanels 26 can be configured to illuminate sequentially, concurrently or in any suitable combination of the subpanels 26 in a manner that will be discussed in greater detail subsequently. In the embodiment depicted in FIG. 2, the illumination means can be thin film transistor liquid-crystal display (TFT LCD) panels. It has been found that TFT LCD panels provide a structurally durable and effective illumination source. The TFT LCD panels that are employed herein will require no graphic necessity protocols in certain embodiments as depicted herein. The TFT LCD panels will include backlit filaments that project through transfuser glass to the outer TFT panes themselves to produce an edge to edge HD lighting of the interior of the associated carry bag 100. It is contemplated that at least a portion of the multiple subpanels 26 will be configured with the TFT LCD panels and suitable transfuser glass.

The body member 12 can include a mechanism and/or processor controller unit 27 or other device having suitable programic logic to trigger illumination of an individual subpanels 26 in a sequential manner such that one or more subpanels 26 illuminate and then power down in a defined interval. In certain embodiments, the defined interval may be between 10 and 60 seconds with intervals between 20 and 40 seconds being employed in certain applications. In the device disclosed herein, it is contemplated that the illumination means in various subpanels 26 will illuminate and power down in a suitable sequence sufficient to provide illumination for the interior of the associated carry bag 100.

It is contemplated that the body member 12 will have an average thickness that is sufficient to support components mounted thereon and to maintain structural integrity of the power supply/illumination element 10 during use. In certain embodiments, it is contemplated that this thickness of body member 12 will be between about 0.1 and 1.25 inches. It is contemplated that the ratio of panel length of the body member 12 to panel width is between 10 to 1 and 40 to 1 in certain situations and applications. The various panels can include reinforcement members that can surround one or more of the panel elements to impart suitable element strength and durability.

The power supply/illumination element 10 can include at least one suitable rechargeable power storage unit 30 that is mounted on the body member 12 and is in electrical contact with suitable devices present in one or more subpanels 26 such as illumination device 25 and/or charging ports. In certain embodiments, the power supply/illumination element 10 can have a plurality of individual rechargeable power storage units 30. One illustrative configuration for multiple storage units is depicted in FIG. 3.

Figure 3A:
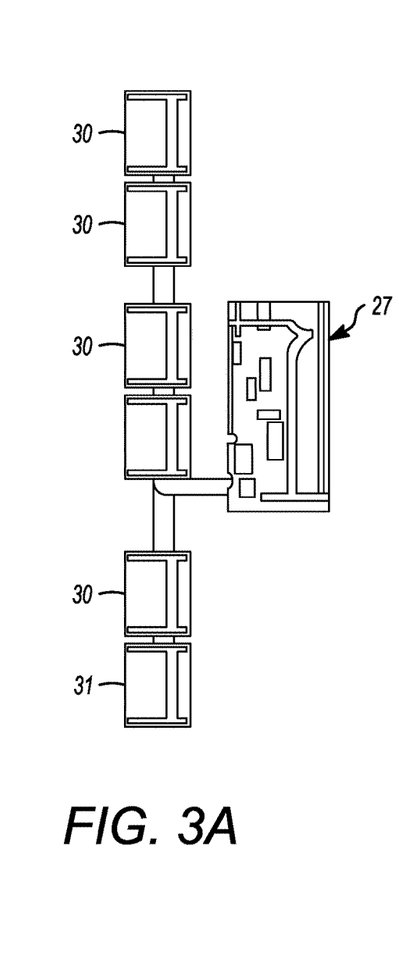
FIG. 3A is a partial cutaway view taken from the lower side of the power supply element unit of FIG. 2A illustrating one embodiment of a battery arrangement.
Figure 3B:
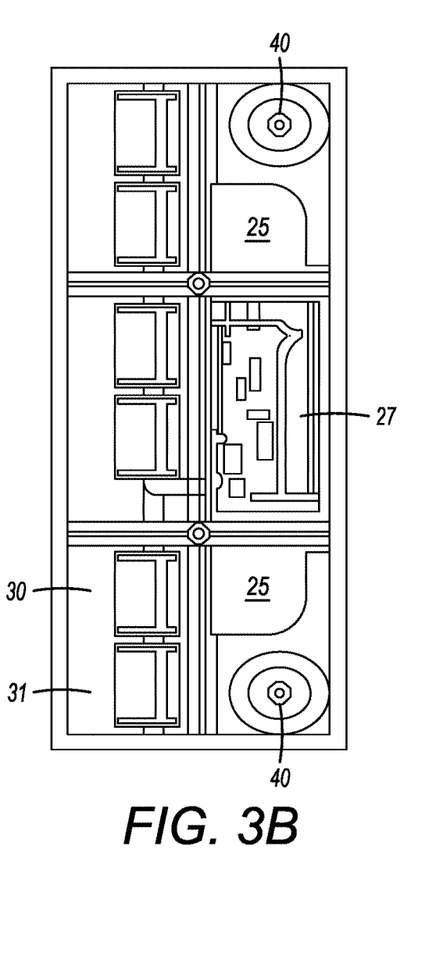
FIG. 3B is a partial cutaway view taken from the upper side of the power supply unit of FIG. 2A.
Figure 3C:
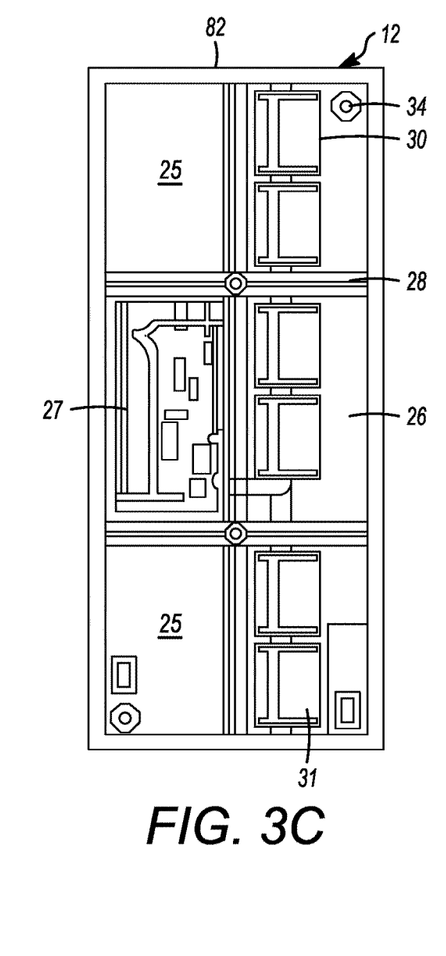
FIG. 3C is a detail of an embodiment of the battery arrangement in the power supply element unit of FIG. 2A.

In the embodiment depicted in FIG. 3, each of the six subpanels 26 are electrically connected to at least one rechargeable power storage unit 30. Non-limiting examples of suitable power storage units include various battery devices of which 3.7 volt lithium ion or lithium ion polymer battery devices are but one non-limiting example.

As shown in FIG. 3, six power storage units 30 are in operational contact with a suitable processing controller unit 27. FIG. 3B depicts the power supply element 10 with an alternate cut-away and depicts six additional rechargeable power storage device 30 in operational contact with a suitable processing controller unit 27. It is contemplated that the various rechargeable power storage devices 30 can be maintained in separate segments if desired or required.

While processing controller unit 31 as depicted is present as a single body maintained in one of the subpanels 26 as depicted in FIG. 3, it is also within the purview of this disclosure to maintain the PCU 27 as a plurality of subunits in electronic communication in one or more to the subpanels 26.

Discharge of one or more rechargeable power storage units 30 can be governed and controlled by the processing controller unit 27 and can provide power on demand for at least one personal electronic device and/or the illumination device 25 as when the personal electronic device is placed in releasable electrical communication with the power supply/illumination element 10. The processing controller unit 27 can include suitable program logic that can control the discharge of one or more power stage units to deliver suitable power to the associated personal electronic device and/or illumination device(s) 25. It is contemplated that power delivery can result in discharge from one or more of the rechargeable power storage devices 30 that can be triggered in a sequential fashion as will be described in detail subsequently.

In certain embodiments, the power supply units can be a plurality of individual battery units which are arrayed for sequential discharge in a suitable manner. The battery units can be arrayed and associated with the power supply element 10 in certain embodiments. However, it is also considered to be within the purview of this disclosure to that the power supply element 10 be configured to receive and maintain at least one removable battery unit 31. When so configured, the removable battery unit 31 can be one that can be detached from contact with the associated battery array for use in a personal electronic device and can be reinserted for recharge as necessary. The PCU 27 can include suitable logic to permit recharge of the removable battery unit 31, as well operation of the power supply element 10 with and without the presence of the removable battery unit 31.

The rechargeable power storage devices 30 can be operatively coupled with a suitable charge processor/controller that is integrated in to the PCU 27 to control and regulate charging and discharge where desired or required. The charge processor/controller can be connected to and coordinated with the function of processor unit 31.

The power supply element 10 can also include one or more means for recharging the power storage unit(s) 30 and/or the removable battery unit 31 that are present in the power supply/illumination element 10. In one embodiment, the recharging means may include induction coils such as dual induction coil arrays 32, 32' that are in electric communication to the battery array and are configured to be brought into connection with a suitable charging panel that is located external to the associated carry bag unit 110. One non-limiting example of such a suitable charging panel is a multi-station induction coil transmitter (not shown). Non-limiting examples of such induction coil transmitter units can be those that are employed to recharge cell phones and the like. In applications where the power supply element 10 is integrated into a suitable carry bag unit 110, it is contemplated that recharging can be accomplished by placing the carry bag unit 110 with the associated power supply element 10 in proximate contact with the desired externally located induction coil transmitter. Thus when the carry bag unit 110 having the power supply/illumination element 10 integrated into and forming the bottom portion of the bag unit 110 is placed in contact with the multi-station induction coil transmitter, the various power storage unit(s) 30 and/or removable battery unit 31 can be recharged with charge delivery governed and/or modulated by the on board processor control unit 27.

It is also contemplated that the recharging means can also include at least one charging port that can be coupled to a suitable externally located charging outlet such as a power cord or the like that can be coupled to an external power source. In various embodiments, the power supply element 10 will include multiple charging options. These can include various ports 34, 34' for direct AC charging as well as suitable USB port(s) 36 for PC desk charging. Where desired or required, the body member 12 can include suitable electronic ports for alternative energy charging such as connection to a suitable portable or fixed solar panel array or hand crank, AC transformer or the like non-limiting embodiments of which as depicted in FIG. 6 A-C.

It is also contemplated that the rechargeable power storage unit(s) 30 and associated charge processor/controller 3 and/or the processor controller unit 31 can also include suitable charge regulators and indicators including but not limited to audible alarms signalling beginning and or the end of the recharge cycle. In certain embodiments, it is contemplated that the processor controller unit 27 and/or processor/controller can be configured with suitable programmic logic to trigger the sequential operation of power unit(s) and/or illumination units based upon receipt of one or more suitable initiation and/or termination command signals. In some embodiments, it is contemplated that the initiation and termination signals will be dispatched in a manner to maintain integrity of the power supply element 10. It is also contemplated that the power supply element 10 can be configured with a suitable on/off switch coupled to the illumination elements permit the user to turn the illumination elements on and off as desired.

The processor 31 and/or processor/controller can be configured to produce a signal upon receipt of a user-originated command that powers the illumination device(s) 26 and initiates lighting for an interval suitable for the user to locate and identify an item or items contained in the carry bag 110; for example for 30 seconds. Where multiple illumination device(s) 26 are employed, the various devices can be illuminated simultaneously or in any configuration suitable to provide illumination.

The processor controller unit 27 can include suitable command and control logic that will permit the individual discharge of individual power storage units 30 present in the array such that no more than two individual power storage units 30 are located in a specific subpanel 26. In a circuit array having six individual power storage units 30, the power supply element 10 is configured to permit administration of electrical charge for a defined and limited interval, for example an interval of no more than 20 minutes; after which a separate power storage unit 30 is brought on line and discharged. The discharge sequence can be configured to assure that heat generated by an individual power storage unit has sufficient interval to dissipate and the individual power storage unit 30 is allowed to cool. For example in a six-unit array the cycling pattern may be power unit one, power unit three, power unit five, power unit two, power unit four, power unit six. Recharge and can progress in a similar sequence.

In the embodiment depicted in FIGS. 1 and 2, the power supply/illumination element 10 is configured with a plurality of feet 40 mounted to and projecting outward from the first face 14 of the body member 12 of the power supply element 10. The feet 40 can have any suitable configuration, with one non-limiting example of such feet 40 being depicted in FIG. 4 as cylindrical bodies 42 having an outwardly projection face 44 with an insulating member 46 attached thereto.

Where desired or required, the power supply element 10 can also include one or more temperature modulation devices such as heat sink(s) 52. Heat sink(s) 52 can be located in stacked relationship proximate to associated power storage units 30 to assist in heat dissipation during charge and discharge cycles.

The power supply element 10 also can include suitable fuse(s), power arrest buttons and voltage overrides, etc. integrated in electronic circuitry as desired or required. One non-limiting example of such elements is depicted in the various drawing figures in which the first face 14 of the body member 12 includes a suitable fuse reset button 50 and/or a voltage override switch 52 operatively connected to the power array.

In the embodiment as illustrated in FIG. 2, the fuse reset and voltage override switch are configured to provide a slide rule voltage setting that can be mapped for proper voltage delivery and transfer and can act as a voltage tester to ascertain the functionality of each of the power storage units 30.

Figure 4:
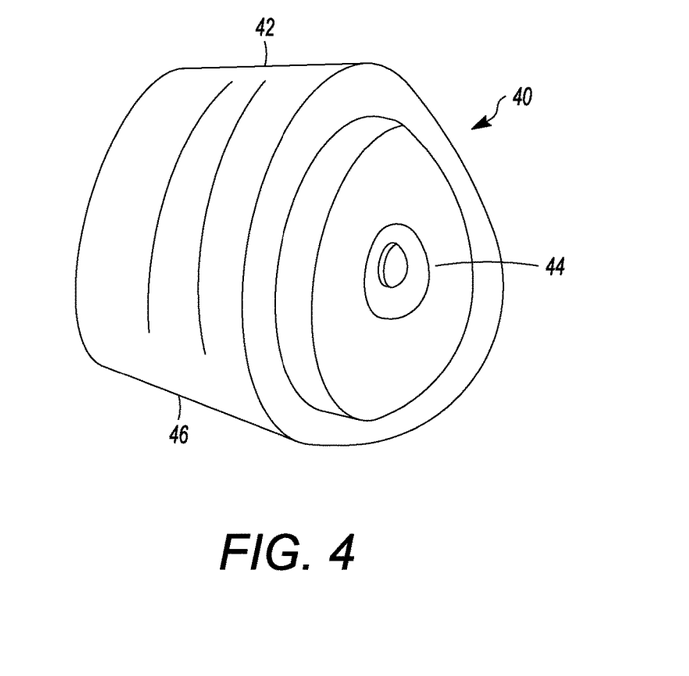
FIG. 4 is a detail of an embodiment of an insulation foot as shown in FIG. 3A.

The power supply/illumination element 10 can be configured with an on/off illumination switch configured to permit the user to illuminate the interior of the carry bag 110. One non-limiting embodiment of a suitable on/off switch is depicted in present in the power supply/illumination element 10 can be configured as one of the feet 40. One non-limiting example of such configuration is illustrated in FIGS. 2 and 4 in which switch 48 is configured as one of the feet 40 and has a retractable center switch 49 that is electrically connected to the processing controller unit 27 and/or on-board power storage unit(s) 30. The switch 49 can be configured in a suitable circuit to control lighting, personal electronic device recharge or both. The switch 48 can be triggered by exerting compression force on the trigger foot 48 either by hand or by pressing the carry bag 110 against a support surface.

Where desired or required, the power supply element 10 can also include suitable auxiliary outlets such as auxiliary outlets 54, 56 such as those defined in the opposed second upwardly oriented face 16 of the body member 12. It is contemplated that the auxiliary outlets 54, 56 can be configured to connect with suitable external charge generating devices, including, but not limited to, devices such as alternating current transformers, portable solar panels, various hand crank generating devices and the like. Where such external charging is required, a suitable transformer with associated power cord can be connected to the auxiliary outlet 34, 36 and to a wall outlet or other charge generating device to provide a regulated charge to power storage unit(s) connected to the power supply element 10.

The carry bag unit 110 can include a suitable orifice or opening defined in one or more faces through which the power cord can temporarily project during the charging cycle. When charging is desired, the associated power cord can be connected to the power supply element 10 mounted in the carry bag unit 110 and connected to a suitable external power source until the recharging cycle is complete. When power storage unit(s) 30 associated with the power supply element 10 are recharged, the associated power cord can be disconnected and the carry bag 110 is ready for continued use.

The power storage unit(s) 30 can be mounted on the body member 12 of the power supply element 10 in any suitable manner and can be placed in electrical and electronic communication with the processor/controller 31 to regulate and control charge and discharge of the various power storage unit(s) 30. In the embodiment illustrated in the FIG. 3, five individual power storage units 30 are mounted on the body member 12. Typically, the power storage units 30 are positioned in the power supply element 10 at a location between the illumination devices 39 and the heat sink member 52. It is contemplated that heat produced by the charge and discharge cycles of the power storage unit(s) 30 can be dissipated by the heat sink member 52.

Figure 5:
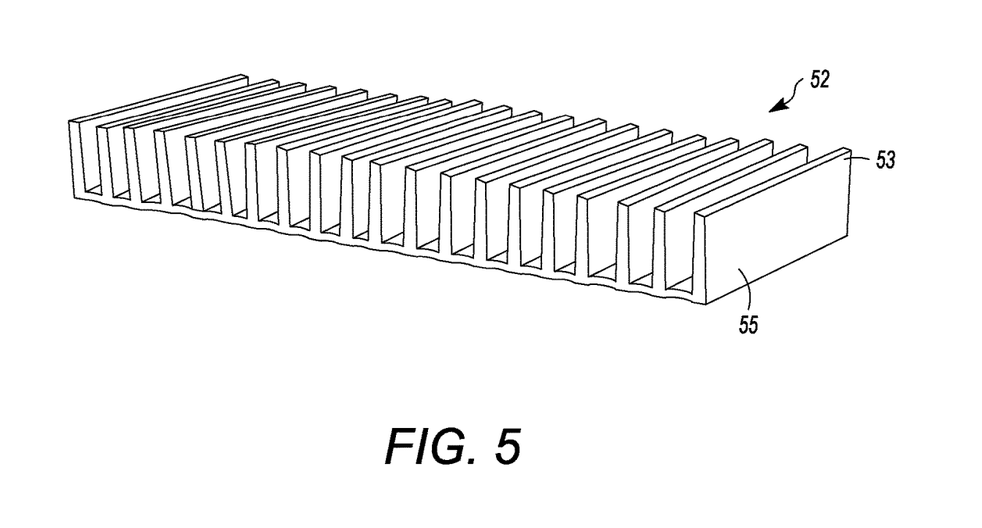
FIG. 5 is an embodiment of a heat sink mechanism suitable for use in a the power element as used herein.

In the embodiment depicted in the drawing figures, the heat sink 52 can be connected to the first face 14 of the body member 12 in interposed relationship between the first face and the induction coils 32, 32'. The heat sink 52 can be employed to dissipate heat produced during operation of the illumination device(s) and/or charge/discharge of the associated power storage units. The heat sink 52 can be of any suitable size and can have any suitable configuration. The heat sink 52 can be composed of a suitable thermal transfer material and can be configured with suitable elongated fins 53 that extend outward from a base member 55. The heat sink 52 can be oriented such that the base 55 is proximate to the heat-generating source or sources and the fins 53 project outward therefrom to aid in the transfer of heat away from the power supply element 10.

The charge and discharge intervals associated with the respective power storage units 30 can be regulated by the processor/controller 31. In certain embodiments, the power supply element 10 can include charge/discharge regulators that control the interval of the charge and/or discharge cycle of each respective power storage element 10 and well as the sequence of the activation and deactivation of the various individual power storage units 30. The regulators can be configured as temperature sensors, chronometers or nay combination thereof. The temperatures sensors can be configured to measure the operating temperature of a given power storage unit 30 during charge and/or discharge cycles. When the temperature of the respective power storage unit 30 reaches a predetermined value, the sensor can provide a signal to the processor/controller 31 which can produce a command to discontinue operation of the power storage unit 30 and initiate charge or discharge of other power supply units 30 in the associated array.

The power supply element 10 also includes at least one USB connection port 60, 62 that can be defined in the second upwardly oriented face 16 of the body member 12. The power supply element 10 can include a plurality of USB connectors with USB connectors of various sizes such as standard and mini USB connectors. The USB connectors are operatively and electrically connected to a suitable circuit including the power array of the power supply units(s) 30 to supply power to a suitable personal electronic device when required.

Thus, when a personal electronic device that requires an emergency charge is connected to the associated USB connector 60, 62, or when illumination is desired, the processor/controller issues a discharge command to an initial power storage unit 30. Discharge can proceed for a predetermined interval. Once the predetermined interval has been achieved, the processor/controller 31 can issue a command to discontinue discharge of the associated power storage unit 30 with essentially concurrent discharge of an additional power storage unit 30 so that the associated personal electronic device receives continuous operational power. Discharge can proceed from a first power storage device 30 to each successive power storage unit 30 and repeat the cycle as desired or required.

It is also contemplated that electric charge delivery can be regulated by the temperature of the power storage unit 30. When the operating temperature of a given power storage unit 30 reaches a defined threshold, the processor/controller 31 can issue a command to discontinue discharge from the power storage unit 30 in question and proceed to discharge from successive one of the other power storage units 30 in the associated array. In this manner, the temperature of the power supply element 10 can be maintained at a suitable operational level during charging and/or discharging. Thus, the body member 12 and/or the various subpanels 26 can include suitable temperature sensors and circuitry to regulate and govern discharge relative to temperature The power supply element 10 can also include a suitable flange 76 connected to the body member 12 and extending around and projecting from its periphery to a spaced distance therefrom. The flange 76 is configured to provide a mounting surface sufficient to connect the power supply element 10 to a surface such an associated surface of an associated carry bag unit 110 by any suitable means. Non-limiting examples of such connection means include sewing, fusing welding, gluing, clamping and the like.

In certain embodiments, it is contemplated that the power supply element 10 can include suitable waterproof layer members 78, 80 in overlying relationship to the body member 12 of the power supply/illumination element 10.

In certain embodiments, where the power supply/illumination element 10 is be composed of a body member 12 that is composed of a plurality of subpanels 26, it is contemplated that the aforementioned elements can be arranged in stacked relationship to create separate cells containing suitable elements such as the induction coils, the power storage devices, the illumination devices and the like. Without being bound to any theory, it is submitted that arrangement into separate cells can assist in heat management and can promote electronic and functional integrity.

The subpanels 26 of the body member 12 can have rubberized flanges 28 interposed therebetween that maintain the waterproof nature of the power supply/illumination element 10 while permitting various wires to traverse therein. The rubberized flanges cooperatively function as a halo bracket that maintains the integrity and functionality of the subpanels 26 and the body member 12. It is contemplated that the aforementioned configuration will permit the body member 12 and associated power supply/illumination element 10 a degree of flexure. In certain embodiments, it is contemplated that the degree of flex can be from negative 5 degree to positive 5 degrees from horizontal when necessary.

The body member 12 can also include a fabric ring 82 surrounding and projecting outward from the respective sides of the body member in an essential coplanar relationship thereto. The fabric ring 82 can allow for rapid attachment and glue mending while providing structural integrity for the body member 12.

It is also contemplated that the carry bag 100 can be configured with a suitable zipper opening (not shown) configured to provide access to USB ports and the like located on the power supply/illumination element 10 as desired or required.

The disclosure also contemplates that a method and device for wirelessly charging an associated phone or other portable device. Carry bag 100 can be configured with carry bag unit with at least one power supply/illumination element 10 integrally connected thereto. The carry bag 100 can have a side wall member 120 that is configured with at least one pocket configured to removably receive a personal cellular device such as a cell phone. The side wall member can have two outwardly oriented pockets. Where desired or required, the side wall member 120 can include one or more inwardly oriented pockets. In certain embodiments, the carry bag 100 can include an inner and outer pocket or pockets that are opposed to one another. The side wall 110 also includes at least one wireless transmitter that is suitably attached to the side wall member 120 and is in operative electrical contact with the power supply/illumination element 10. In certain embodiments, the wireless transmitter can be integrated into the shell of the side wall member 120 at a location proximate to the at least one device receiving pocket. In other embodiments, the wireless transmitter can be integrated into one of the interior pockets.

It is contemplated that, when the power supply element 10 is connected to a suitable external power source such as an AC power outlet P as by a cord and deliver charge to the power supply element a A cable 272 interposed between the power storage unit 10 and the wireless transmitter can power the wireless conductor transmitter to charge the device located proximate thereto.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A carry bag comprising:
    a shell having at least a first side wall and a second side wall, the first side wall and the second side wall defining an opening proximate to a first upper region and having a lower second region distal to the first upper portion; and
    a power supply element connected to the to the lower second region of the first and second side walls of the shell and extending therein between, the power supply element including:
        a body member, the body member having a first face, a second face opposed to the first face and an outer perimeter defined by the body member;
        at least one rechargeable power storage unit connected to the body member;
        at least one power outlet in electrical communication with the at least one power storage unit, the at least one power outlet configured to releasibly and operatively receive a power cord associated with a personal electronic device; and
        at the least one connector located on the body member in connectable contact with the shell proximate to the lower second region when the carry bag is in a use position.

2. The bag of claim 1 wherein the power supply element further comprises an illumination member mounted on the body member, the illumination member including at least one light emitting source associated with and electrically connected to the at least one rechargeable power storage unit.

3. The carry bag of claim 1 further comprising a recharging member in electric contact with the at least one rechargeable power storage unit and in detachable contact with an external power source.

4. The carry bag of claim 3 wherein the recharging member comprises an induction charging device, the induction charging device communicating with an exterior surface of the bag, the induction member in electric contact with the power storage unit, wherein the induction member is configured to removably mate with a suitable mating induction coil transmitter member external to the bag.

5. The carry bag of claim 4 wherein the induction charging device includes an indicator providing a physical indication of at least one of commencement of charge, and/or completion of charge.

6. The carry bag of claim 1 wherein the body member is composed of at least two subsection members, the subsection members in a flat planar relationship to each other, the body member having at least one insulation member interposed between the two substrate members of the at least two subsection members.

7. The carry bag of claim 1 wherein the at least one power outlet element further comprises at least one auxiliary power storage unit.

8. A carry bag comprising:
    a shell having at least a first side wall and a second side wall, the first side wall and the second side wall defining an opening proximate to a first upper region and having a lower second region distal to the first upper portion;
    a power unit element connected to the to the lower second regions of the first and second side walls of the shell and extending there between, the power supply element including:
        a body member, the body member having a first face, a second face opposed to the first face and an outer perimeter defined by the body member, the body member having a plurality of discrete subsections, the subsections being electrically isolated from one another;
        at least two rechargeable power storage units, the respective subsection member contained in two separate subsections of the plurality of discrete subsections;
        at least one power outlet in electrical communication with the at least two rechargeable power storage units, the at least one power outlet configured to releasibly and operatively receive a power cord associated with a personal electronic device;
        at the least one connector located on the body member in connectable contact with the shell proximate to the lower second region when the carry bag is in a use position; and
        at least two illumination members contained in the body member, the at least two illumination members including at least one light emitting source associated with and electrically connected to one power storage unit of the at least two rechargeable power storage units, the at least two illumination members contained in the plurality of discrete subsections of the body member; and
        at least one processor control unit contained in one discrete subsection of the plurality of discrete subsections of the body member, the at least one processor control unit containing programmable logic and operatively communicating with and sequentially triggering operation of the at least two illumination members and the at least two rechargeable power storage units.

9. The carry bag of claim 8 further comprising a recharging member in electric contact with the at least two rechargeable power storage units and in detachable contact with an external power source.

10. The carry bag of claim 9 wherein the recharging member comprises an induction charging device, the induction charging device communicating with an exterior surface of the carry bag, an induction member in electric contact with one power storage unit of the at least two rechargeable power storage units, wherein the induction member is configured to removably mate with a suitable mating induction coil transmitter member external to the carry bag.

11. The carry bag of claim 10 wherein the induction charging device is contained within at least one subsection of the plurality of discrete subsections of the body member.

12. The carry bag of claim 11 wherein the plurality of subsections are in a flat planar relationship to each other, and the body member further comprises at least one insulation member interposed between respective two subsections of the plurality of subsections.

13. The carry bag of claim 10 wherein the induction charging device includes an indicator providing a physical indication of at least one of commencement of charge and/or completion of charge.

14. The carry bag of claim 8 wherein the at least one power outlet further comprises at least one auxiliary power storage unit removable engageable with the body member.

* * * * *